US012796854B2

(12) United States Patent
Beausire et al.

(10) Patent No.: US 12,796,854 B2
(45) Date of Patent: Nov. 17, 2026

(54) BEVERAGE PREPARATION SYSTEM

(71) Applicant: SOCIETE DES PRODUITS NESTLE S.A., Vevey (CH)

(72) Inventors: Cedric Beausire, Bavois (CH); Didier Vuagniaux, Gimel (CH)

(73) Assignee: Société des Produits Nestlé S.A., Vevey (CH)

( * ) Notice: Subject to any disclaimer, the term of this patent is extended or adjusted under 35 U.S.C. 154(b) by 479 days.

(21) Appl. No.: 18/293,250

(22) PCT Filed: Jul. 29, 2022

(86) PCT No.: PCT/EP2022/071425

§ 371 (c)(1),
(2) Date: Jan. 29, 2024

(87) PCT Pub. No.: WO2023/006984

PCT Pub. Date: Feb. 2, 2023

(65) Prior Publication Data

US 2025/0072650 A1 Mar. 6, 2025

(30) Foreign Application Priority Data

Jul. 30, 2021 (EP) .................................... 21188906

(51) Int. Cl.
*A47J 31/40* (2006.01)
*A47J 31/44* (2006.01)
(Continued)

(52) U.S. Cl.
CPC ......... *A47J 31/407* (2013.01); *A47J 31/4403* (2013.01); *A47J 31/4407* (2013.01);
(Continued)

(58) Field of Classification Search
CPC .......... A47J 31/40; A47J 31/407; A47J 31/44; A47J 31/4403; A47J 31/4407; A47J 31/46;
(Continued)

(56) References Cited

U.S. PATENT DOCUMENTS 9,282,848 B2 * 3/2016 Weijers .............. B65D 85/8049
2012/0138635 A1 * 6/2012 Norris .................. B67D 3/0009
222/131
(Continued)

FOREIGN PATENT DOCUMENTS

CL 2022001471 2/2023
CL 2024000279 8/2024
(Continued)

*Primary Examiner* — Ashesh Dangol
(74) *Attorney, Agent, or Firm* — Thorpe North & Western, LLP

(57) ABSTRACT

A beverage production system can include a pack (IO) and a module (I) for producing a beverage from said pack, said module (I) comprising: a movable fluid processing device (11) to introduce a fluid into said pack and to dispense a beverage from the pack, and a pack holder assembly (2) comprising a pack chamber (22) and a door (23) that is movable relatively to the pack chamber and is configured to be positioned in at least: a first opened position wherein said door uncovers the pack inlet (222) of the pack chamber, and a second closed position wherein said door covers the pack inlet (222) of the pack chamber and is able to enclose the pack inside the pack chamber, wherein, when the door (23) is in the first opened position, the whole pack holder assembly (2) is removable from the module (I).

16 Claims, 9 Drawing Sheets

(51) Int. Cl.
*A47J 31/46* (2006.01)
*A47J 31/52* (2006.01)
*B65D 85/804* (2006.01)

(52) U.S. Cl.
CPC ......... *A47J 31/446* (2013.01); *A47J 31/4492* (2013.01); *A47J 31/46* (2013.01); *A47J 31/52* (2013.01); *B65D 85/8043* (2013.01)

(58) Field of Classification Search
CPC .. A47J 31/369; A47J 31/3695; A47J 31/4492; B65D 85/8043; B65D 85/8052
See application file for complete search history.

(56) References Cited

U.S. PATENT DOCUMENTS

| | | | | |
|---|---|---|---|---|
| 2014/0120223 | A1 | 5/2014 | Boubeddi et al. | |
| 2016/0106255 | A1* | 4/2016 | Gordon | A47J 31/469 99/295 |
| 2017/0217749 | A1* | 8/2017 | Calderone | A47J 31/4403 |
| 2017/0252992 | A1 | 9/2017 | Wood et al. | |
| 2020/0345170 | A1* | 11/2020 | Jarisch | A47J 31/407 |

FOREIGN PATENT DOCUMENTS

| | | |
|---|---|---|
| CN | 104814670 | 8/2015 |
| CN | 105962774 | 9/2016 |
| CN | 206080181 | 4/2017 |
| CN | 206560336 | 10/2017 |
| CN | 111166184 | 5/2020 |
| JP | 2017511714 | 4/2017 |
| JP | 2017527340 | 9/2017 |
| JP | 2021533968 | 12/2021 |
| RU | 2015139686 | 3/2017 |
| WO | 2019091775 | 5/2019 |
| WO | 2020035737 | 2/2020 |
| WO | 2020038880 | 2/2020 |
| WO | 2021110652 | 6/2021 |

* cited by examiner

BEVERAGE PREPARATION SYSTEM

CROSS REFERENCE TO RELATED APPLICATIONS

The present application is a National Stage of International Application No. PCT/EP2022/071425, filed on Jul. 29, 2022, which claims priority to European Patent Application No. 21188906.8, filed on Jul. 30, 2021, the entire contents of which are being incorporated herein by reference.

FIELD OF THE INVENTION

The present invention relates to a beverage system using packs of beverage ingredient.

BACKGROUND OF THE INVENTION

WO 2021/110652 describes a beverage preparation machine for the preparation of beverages from containers holding beverage ingredients. The system machine a specific fluid processing device designed to pierce the bottom of a container introduced inside the machine, to introduce fluid therein through its fluid inlet and to dispense the beverage resulting from the mixing of the ingredient and fluid though a specific dispensing outlet of this device. Two different relative positions of the device and the container enable either the introduction of fluid or the dispensing of beverage.

Since the size of these containers can be rather large, after beverage preparation and once the beverage has been fully dispensed, used containers are not automatically ejected and stored in a bin integrated to the machine. Accordingly, the container is removed manually from the beverage preparation machine and thrown away by the user. Yet frequently, a little bit of the liquid still remains inside the container and when the user grabs the container, particularly if it is made of flexible material, liquid can drip either inside the part of the machine holding the container or outside and around the machine or on the hand of the user creating dirtiness and mess which is not acceptable. There is a need to improve the removal of the container and increase cleanliness.

This container is preferably essentially made of flexible material providing the advantages of compactness, manufacturing speed (forming, filling, sealing can be performed in a row) and enhanced recycling capabilities. These advantages are particularly obtained with a container that is void of any plastic insert, the whole container being made of recyclable or compostable material(s).

Due to the flexible property of the material, it has been observed that the piercing of the bottom of the container can be difficult because the bottom of the container moves or deforms under the force of the fluid processing device. This is an issue because the relative position of this fluid processing device inside the container is critical to obtain a correct preparation of the beverage. In particular, if this device does not correctly pierce the bottom of the container, there is a risk that the device does not enter sufficiently inside the volume of the container. In that situation, the introduction of fluid through the fluid processing device and inside the container leads to a leak of water below the device meaning imperfect preparation of the beverage.

In addition, it has been observed that, even if the device pierces correctly the flexible material of the bottom, the force of the jet of water squirting out of the inlet of the device can be so strong that this force impinges on the internal walls of the container and can push and move the container upwardly. This is particularly true for a flexible container because under the effect of an upwardly force, its upper part is able to fold itself along the top wall of the container holder. This upward movement of the container directly affects the connection between the fluid processing device and the bottom of the container, which creates fluid leaks or the dispensing of the beverage too early in the process of preparation of the beverage.

There is a need to guarantee an efficient piercing and efficient beverage preparation.

An object of the invention is to address the above existing problems.

SUMMARY OF THE INVENTION

In a first aspect of the invention, there is provided a beverage production system comprising a pack and a module for producing a beverage from said pack,

- said pack comprising an ingredient, said ingredient being configured to be mixed with a fluid to produce a beverage, said pack presenting a plane shape oriented along a plane (P), and the bottom side of said pack being configured for being openable,
- said module comprising:
- a movable fluid processing device configured to cooperate with the bottom of the pack to introduce a fluid in said pack and to dispense a beverage from the pack, and
- a pack holder assembly, said pack holder assembly comprising a pack chamber and a door, wherein:
  - the pack chamber is adapted for receiving said pack through an upper pack inlet and for holding said pack so that the plane (P) of the plane shape is oriented in an essentially vertical position inside the module, and
  - said chamber presenting a bottom opening configured to enable access of the movable fluid processing device to the bottom side of said pack hold in the chamber, and
  - the door is movable relatively to the pack chamber and is configured to be positioned in at least:
  - a first opened position wherein the door uncovers the pack inlet of the pack chamber, and
  - a second closed position wherein the door covers the pack inlet of the pack chamber and is able to enclose the pack inside the pack chamber,
- wherein, when the door is in the first opened position, the whole pack holder assembly is removable from the module.

This system comprises a pack comprising a food or beverage ingredient able to produce a beverage further to mixing with an aqueous fluid, preferably water.

This food or beverage ingredient packed in the package can be a water soluble powder or a soluble concentrate in liquid or semi-liquid form. In that embodiment water dissolves the beverage ingredient. The ingredient can be selected within the list of: soups, fruit juices, vegetable juices, bouillons, coffee, chocolate, tea, milk or creamer, smoothies, purees, coulis, creams or any combination thereof. Preferably, the food or beverage ingredient is a soluble food or beverage ingredient selected in the list of:

- instant coffee powder, milk powder, cream powder, instant tea powder, cocoa powder, soup powder, fruit powder or mixture of said powders,
- a coffee concentrate, a milk concentrate, a syrup, a fruit or vegetable concentrate, a tea concentrate, a fruit or vegetable puree.

The powders can be agglomerated or sintered. The powders or liquid concentrates can be mixed with solid pieces for example for preparing soups with solid or encapsulated pieces.

This food or beverage ingredient packed in the package can also contain a food or beverage ingredient able to be infused like a roast and ground coffee, or tea leaves. In that embodiment water extracts the beverage ingredient.

The pack presents a plane shape oriented along a plane (P).

The pack is configured for being openable at its bottom in order to introduce the fluid inside the pack and to dispense the prepared beverage from the pack. Preferably, an area of the bottom side is configured for being openable by piercing, tearing or puncturing in particular by applying an upwardly pointed, acute or sharp device, such as the fluid processing device, to said area. Preferably this area is positioned at the middle of the transversal dimension of the longitudinal shape of the pack. Preferably this openable area is made of a flexible material.

The system comprises a module for producing a beverage which comprises a fluid processing device configured to cooperate with the bottom of the pack to introduce a fluid in the pack in order to prepare a beverage inside the pack and then to dispense the prepared beverage from the pack. This fluid processing device can be the device described in WO 2021/110650. This fluid processing device is movable in different positions, said positions comprising at least one position where the device is out of the pack and at least one other position where the device is introduced inside the pack during the beverage preparation.

In addition, said module comprises a pack holder assembly configured to hold the pack within the module and outside the module too.

This pack holder assembly comprises a pack chamber adapted for receiving a pack for a beverage preparation inside the module. The pack chamber comprises an upper pack inlet to introduce the new pack and the pack chamber is configured for holding the pack in an essentially vertical position inside the module. This vertical position guarantees the efficient preparation of the beverage and particularly the dispensing of the beverage from the pack so that the less possible liquid remains inside the pack at the end of the extraction and when the pack must be removed from the system to be thrown to the bin.

The pack chamber presents a bottom opening configured to enable an access of the movable fluid processing device to the bottom of said pack hold in the chamber. This access or passage is particularly designed to enable the upwards movement of the fluid processing device to the bottom of the pack when it is hold inside the chamber.

In addition, this pack holder assembly comprises a door configured to be positioned in at least two different positions.

In the first position called "opened", the door uncovers the pack inlet of the pack chamber and consequently the introduction of a pack inside the pack holder is enabled.

In the second position called "closed", the door covers the pack inlet of the pack chamber and is able to enclose the pack inside the pack chamber is one pack has been introduced inside the chamber, and consequently a beverage preparation is possible.

When the door is in the first opened position, the whole pack holder assembly, that is including the pack chamber and the door, is removable from the module.

Consequently, in the system, it is possible, at the end of the preparation of a beverage from a pack, to manually remove the whole pack holder assembly encompassing said used pack, in order to hold said pack to the bin and throw it there. At that place, the user needs to touch the pack itself which can exert a pressure on it with the risk that some fluid still present inside the pack would be ejected, particularly if the pack is made of flexible material. Yet due to the presence of the large opened door, any drop that would fall can be collected by the opened door preventing dirtiness around the bin. This pack holder assembly improves cleanliness.

In addition, the removal of the whole pack holder assembly enables a thorough and easy cleaning of said assembly, that can be washed in a washing machine, and of the area of the module for producing a beverage designed to receive the assembly.

Preferably, when the door is in the first opened position, the door forms a handle configured to pull manually the whole pack holder assembly out of the module.

The door forming a handle provides an ergonomically way to remove the whole pack holder assembly from the module. By simply opening the door, the user is able to catch the door and bring the used pack to the bin conveniently.

Preferably, the pack chamber presents a plane shape oriented along a plane (Pc), said plane of the chamber being oriented in an essentially vertical position inside the module, and the chamber is adapted for holding the pack so that the plane (P) extends along the plane (Pc) of the chamber, and in the first opened position of the door, the door is inclined by an angle $\alpha$ of at least 45°, preferably at least 60° with said plane of the chamber (Pc).

This configuration provides simultaneously an easy access to the chamber inlet to introduce the pack and a convenient way to hold the whole pack holder assembly for a user: by manually holding the door, the user can easily pull up the whole pack holder assembly to remove it from the module and then hold it correctly while keeping the same orientation. The movement is easy. In addition keeping the pack always in the same orientation, which is the position at the end of the beverage preparation, limits the risk of having fluid leaking from the pack. Close to the bin or the sink, the user can pull out the pack from the chamber inlet as the door provides a large opening above the pack.

Usually, the module comprises a receiving area configured to receive and hold the pack holder assembly, and this receiving area and the pack holder assembly comprise respective cooperating means to position the bottom opening the pack holder assembly relatively to the movable fluid processing device.

Accordingly, after having been removed from the module, the pack holder assembly is positioned correctly inside the module for the next beverage preparation.

In the present invention fluid covers either any aqueous diluent that can be mixed with a soluble beverage ingredient to prepare a beverage, like water, carbonated water, milk, etc. (preferably, water is the preferred aqueous diluent) or any gaseous fluid such as for example air. When referring to aqueous fluid, water is the preferred fluid; when referring to gaseous fluid, air is the preferred fluid.

According to the invention, the package is arranged essentially vertically during the production and dispensing of the food or beverage product.

According to the present invention, the aqueous fluid, typically water, is supplied into the package at any temperature: cold, ambient or hot, depending on the type of food or beverage product to be prepared Preferably most of the walls of the pack are made of flexible material. Yet in less preferred embodiments, the pack can be made at least partly of semi-flexible or even rigid material.

Preferably, the pack holder assembly comprises a movable locking device, said movable locking device being configured:

to fix the pack inside the pack holder assembly when the door is in the second closed position, and to release the pack when the door is in the first opened position.

This locking device is movable to either cooperate with the pack and fix it or to move apart from the pack.

Due to this movable locking device, the pack can be well fixed inside the pack chamber when the fluid processing device cooperates with the bottom the pack and when fluid is introduced inside the pack.

Preferably, the movable locking device is mechanically connected to the door so that it is configured to be moved, preferably tilt, away from the chamber when the door is in the first opened position and to be pushed to the chamber when the door is in the second closed position..

Du to this connection between the locking device and the door, the position of the movable locking device is coordinated with the position of the door so that the locking device positions and fixes the pack when the door is closed and releases the pack when the door is opened, enabling in that last case the introduction or the removal of a pack in or out of the module.

In the preferred embodiment, the pack comprises at least two holes and/or deformable areas and the locking device comprises corresponding fixing means, preferably pins, said pins being configured to fit in said holes of the pack when the door is in the second closed position.

The at least two holes in the pack are usually provided transversally to the plane shape of the pack.

Preferably these holes are positioned symmetrically around the axis extending longitudinally along the middle of the plane shape of the pack.

Preferably these holes are provided close to the bottom of the pack.

The size (length and diameter) of the corresponding pins of the locking device and the distance between the pins are set to enter in the two holes.

Usually two holes and two pins are sufficient to fix the pack in the pack holding assembly.

In one embodiment, the pack comprises a readable code, and the module for producing a beverage comprises a code reader, and the chamber and the locking device are designed so that, when the door is in the second closed position, the movable locking device positions the code in front of the reader.

The code of the pack can be any type of code like: mechanical code, optical code (including colour code, codes printed with non-visible ink, one-dimension barcode, two dimensions bar code, QRcode), RFID tags, magnetic code, conductivity code Generally, the code provides directly or indirectly information related to the contained product, said information being comprised in the list of: identification of the product, quantity of product, beverage preparation parameters or any combinations thereof. The beverage preparation parameters can provide:

water volume, water temperature and/or water pressure, and/or time sequence for water injection, air injection, pause, injection and dispensing in sequential or simultaneous manner.

Usually, the readable code is positioned on at least one side of the pack, said side extending along the plane (P).

The chamber and the locking device present designs enabling the positioning of the readable code in front of the code reader when the door is in the second closed position, that is when the beverage preparation is possible.

In one embodiment, the movable locking device can be shaped so that, when the door is in the second closed position, the movable locking device pushes the code in direction of the reader.

Preferably in the system, the fluid processing device comprises at least one fluid inlet for introducing a fluid into the pack hold in the chamber for the preparation of a beverage by mixing said fluid with the ingredient contained in said pack, and at least one beverage outlet for dispensing said prepared beverage from said pack hold in the chamber.

In such a preferred embodiment, the fluid processing device corresponds to one of the devices disclosed in WO 2021/110650, WO 2021/110652 or WO 2021/110654.

Preferably, the actuating device is configured to move the fluid processing device to the pack whereas the pack is hold in the chamber in a fixed manner.

In fact, since the pack holder assembly is removable from the module, once it has been positioned inside the module, it is preferable to let it immobile inside the module to avoid a too complex architecture of the module.

Preferably, the actuating device is configured to move the fluid processing device upwardly to the bottom side of the fixed pack.

Preferably, the module comprises:

a receiving area configured to receive and hold the pack holder assembly, and an electrical switch, and when the pack holder assembly is in said receiving area, a contacting part of the door is designed to cooperate with the electrical switch so that:

in the first opened position of the door, the contacting part of the door directly or indirectly switches off the electrical switch, and in the second closed position of the door, the contacting part of the door directly or indirectly switches on the electrical switch.

This electrical switch of the module enables the automatic preparation of a beverage with the system, in particular the supply of electrical power to the different electrical devices of the machine such as the actuating device of the fluid processing device.

The door can cooperate directly with this switch through a shape designed to push the switch when the door is closed or indirectly through a movable member designed to move relatively to the electrical switch of the module between a first and a second position, wherein in the first position said movable member releases said electrical switch and a second position said movable member pushes said electrical switch.

With this automatic switch off of electrical power when the door is opened, no risk of injury of the user can happen for example by sudden projection of hot water from the fluid processing device while no pack is present in the assembly and the door is opened.

Preferably, the module comprises a receiving area configured to receive and hold the pack holder assembly and said receiving area comprises at least one first magnet, and the door comprises at least one corresponding second magnet, and said first magnet and second magnet are positioned in the receiving area and in the door respectively so that, when the door is closed, the first and second magnets cooperate.

It has been observed that during a beverage preparation, in particular with a pack made of flexible walls, this pack can inflate inside the chamber and can exert a force on the inside wall of the door such that the door is pushed away and opens during the preparation.

Magnets cooperating between the door and the receiving area of the module prevent this undesired sudden opening.

It is preferred that said first magnet and second magnet are positioned at the upper parts of the receiving area and of the door respectively. Actually, it was observed that it is the upper part of the pack hold in the chamber that inflates and opens the door. By exerting an attraction force between the door and the receiving area at the upper part of the door, the risk that the door opens is limited. For the same reason, it is preferred that the first and second magnets are positioned close to the contacting part of the door designed to interfere with the electrical switch of the module. Consequently, it is preferred that said contacting part of the door is positioned in the upper part of the door.

Preferably, the pack chamber comprises at least one internal front wall, this internal front wall being positioned below the movable door, and at least one rib rises from said internal front wall inside the chamber.

By extending inside the chamber, the end of this rib is close to the surface of the pack or even contacts this surface. Such a rib helps to prevent the upper part of the pack to inflate too much as mentioned above and to prevent the sudden opening of the door too.

Preferably several ribs are designed in the internal front wall.

In a second aspect of the invention, there is provided a pack holder assembly for a beverage production system, said system comprising a pack and a beverage producing module), said pack presenting a plane shape oriented along a plane (P) and comprising two longitudinal plane walls extending along said plane (P) and comprising an openable bottom side at the bottom edges of the longitudinal plane walls, and said module comprising a movable fluid processing device configured to cooperate with the bottom of the pack to introduce a fluid in said pack and to dispense a beverage from the pack,
- a pack chamber presenting a plane shape oriented along a plane (Pc) and an inlet, said chamber being adapted for receiving a pack, said pack presenting a plane shape oriented along a plane (P), through said inlet, and said chamber presenting a bottom opening configured to enable access to the bottom of a pack hold in the chamber, and
- a door configured to be positioned in at least:
  - a first opened position wherein said door uncovers the inlet of the pack chamber, and
  - a second closed position wherein said door covers the inlet of the pack chamber, and
- means to position the pack holder assembly inside a module for producing a beverage from a pack.

The bottom opening is configured to enable access to the bottom of the pack hold in the chamber from the outside, Accordingly, this opening is sufficiently large to enable the movement of a fluid processing device through the opening and then through the pack.

The means to position the pack holder assembly inside the module enables the right orientation of the assembly so that the plane shape of the pack is oriented vertically and that the bottom of the pack is positioned correctly in front of the fluid processing device, an optionally a code present on the pack is positioned in front of a code reader.

Preferably, the door comprises at least one magnet, said magnet being positioned at the upper side of the door.

Preferably, the door comprises a contacting part designed to cooperate with an electrical switch of the module, and this contacting part is positioned in the upper part of the door.

In a third aspect, there is provided the use of a pack holder assembly such as described in the above second aspect in a beverage production system such as described in the above first aspect.

In the present application the terms "internal", "back", "front", "top" "bottom", "lateral", "upper" and "lower" are used to describe the relational positioning of features of the invention. These terms should be understood to refer to the pack in its normal orientation when positioned in a beverage preparation dispenser for the production of a beverage as shown in the figures . . . .

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

Specific embodiments of the invention are now described further, by way of example, with reference to the following drawings in which.

DETAILED DESCRIPTION OF EXEMPLARY EMBODIMENTS

Figure 1:
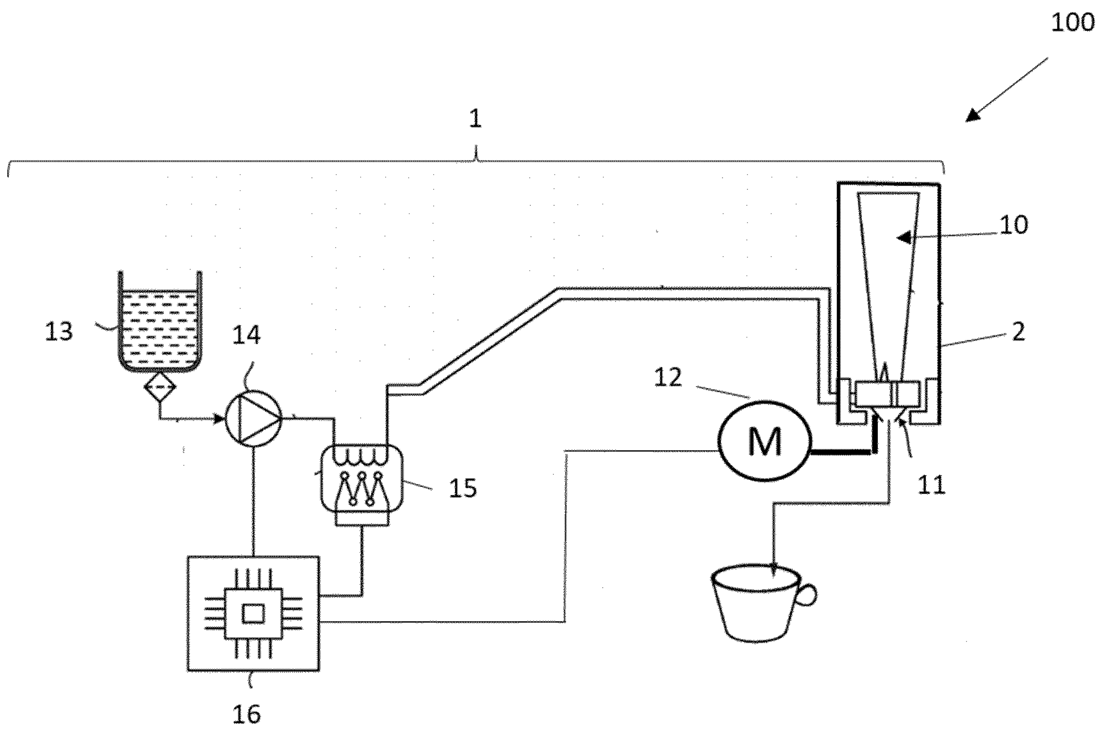
FIG. 1 is a schematic drawing of a beverage production system according to the invention.

FIG. 1 illustrates schematically a beverage production system 100 according to the invention.

The system 100 comprises a module 1 and a pack 10. The module is adapted for receiving the pack and producing a beverage from said pack.

The module 1 comprises a pack holder assembly 2 and a fluid system to introduce a fluid inside the pack.

The fluid system usually comprises a fluid source 13, like a water tank, pumping means 14 to pump the fluid from the source. Usually heating and/or cooling means are part of the system to adapt the temperature of the fluid to be introduced inside the pack.

The fluid is supplied to a fluid processing device 11 configured to cooperate with the bottom of the pack in order to introduce the fluid in said pack.

Generally, the module comprises am actuating device 12 move this fluid processing device 11 to said pack hold in the pack holder assembly 2.

The module comprises usually a system control unit 16 to control the above different devices for the preparation of a beverage from a pack.

Such a beverage production system 100 corresponds to the system described in the publications WO 2021/110650, WO 2021/110654 and/or WO 2021/110652.

Figure 2:
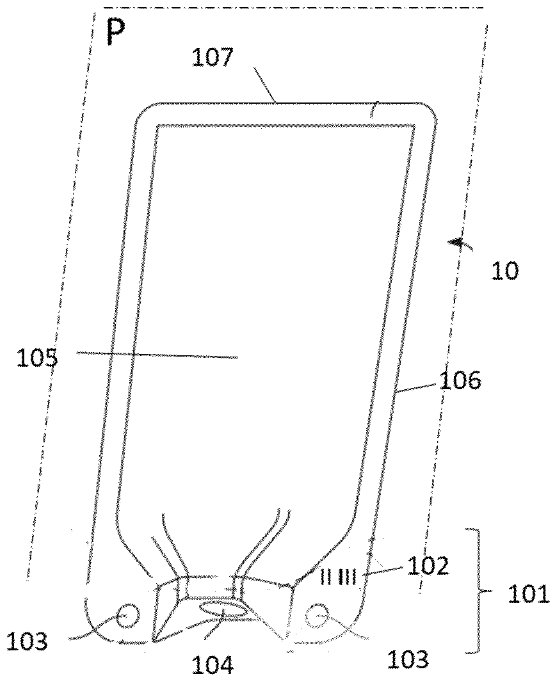
FIG. 2 is perspective view of a pack that can be used in the beverage production system.

FIG. 2 is a perspective view of a pack 10 that can be used in the beverage production system 100 according to the invention.

This pack comprises an ingredient that is configured to be mixed with a fluid to produce a beverage. The pack presents a plane shape oriented along a plane P. Two longitudinal plane walls 105 (front and back) extends along this plane P. The lateral edges 106 of these walls are sealed as well as the edges at the top end 107. The bottom side 101 of said pack is configured for being openable, preferably through a pierceable area 104. The openable area is positioned at an edge of the plane P and enables the dispensing of the beverage along a direction comprised in this plane P.

The pack comprises at least two holes 103 at the bottom end 108.

Figure 3:
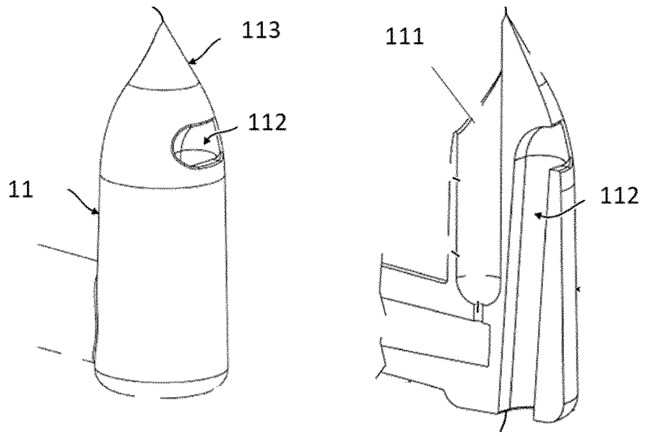
FIG. 3 is perspective view and a cross section view of a fluid processing device that can be used in the beverage production system.

FIG. 3 is perspective view and a cross section view of a fluid processing device 11 that can be used in the beverage production system. It comprises:

- a fluid inlet 111 for introducing a fluid into the openable area 104 of the pack hold in the chamber, and
- a beverage outlet 112 for dispensing the prepared beverage from said pack hold in the chamber.

The actuating device 12 is adapted to move this fluid processing device 11 to said pack hold in the chamber and in particular the pointed part 113 to the openable area 104 in order to open the openable area 104 or any membrane or cover provided at this area. Usually, the fluid processing device is adapted to move along a direction that is comprised in the plane P of the pack.

Other fluid processing device 11 such as described in WO 2021/110650 can be used in the system of the present invention.

Figure 4C:
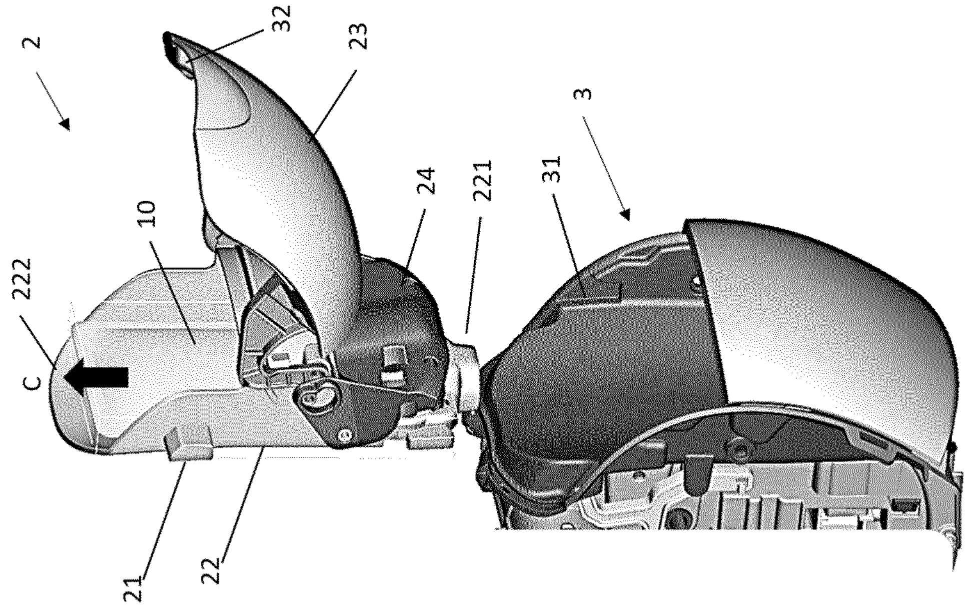
FIGS. 4A-4C are views of the module of the beverage production system according to the invention in three different operations.
Figure 4B:
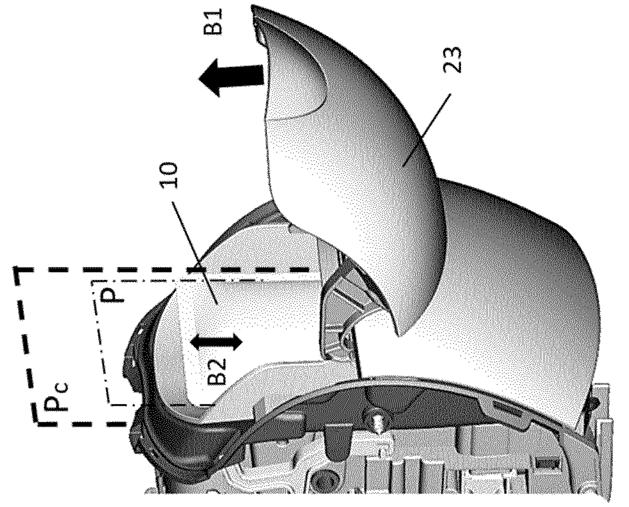
Figure 4A:
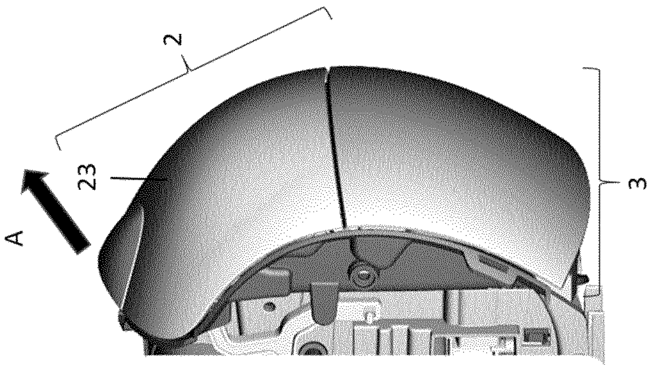

FIGS. 4A to 4C illustrates the part of the module 1 configured to receive the pack. This part of the module comprises a pack holder assembly 2 and a receiving areas 3 configured to receive that assembly 2.

In FIG. 4A, the pack holder assembly 2 is positioned inside the receiving area 3. The pack holder assembly comprises a door 23 that can be opened, as illustrated by the arrow A.

When the door is opened, as illustrated in FIG. 4B, a sachet 10 can be introduced in the pack holder assembly 2 or removed therefrom as desired by the operator and as illustrated by the arrows B2. It can be observed that the plane P of the pack extends along the plane Pc defined by the walls of the pack chamber. In addition, the whole pack holder assembly 2 can be removed from the receiving area by handling the door 23 and pulling it upwardly as illustrated by the arrow E1.

Once the whole pack holder assembly 2 is removed from the receiving area 3, as shown in the FIG. 4C, it can be used by the operator to bring a used pack 10 to the bin, which prevents manipulating the pack that may still contain liquid close to the machine. The operator can pull the pack 10 out of the chamber 22 when he/she is in front of the bin as illustrated by the arrow C. There, the large opened door 23 collects any drop falling from the pack during its removal from the pack chamber and throwing in the bin. The ability to remove completely the pack holder assembly 2 from the module enables a thorough cleaning operation. In particular it is possible to clean efficiently the bottom opening of the chamber where beverage traces can still be present.

Then the pack holder assembly 2 can be positioned back inside the receiving area 3: guiding means 21 on the wall of the pack chamber 22 cooperates with corresponding guiding means 31 of the receiving area.

Figure 5A:
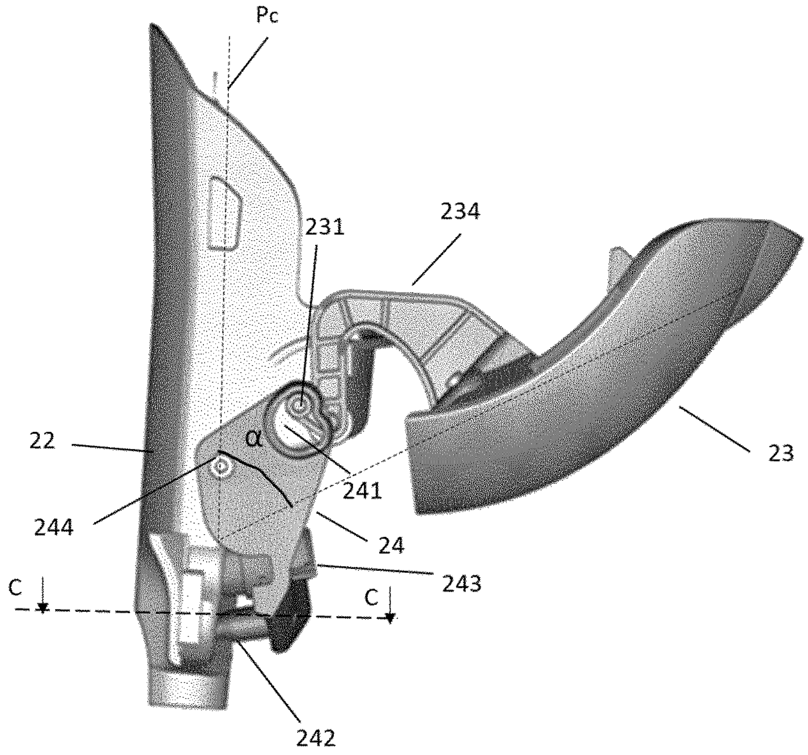
FIGS. 5A and 5B are side view and horizontal cross sectional view along C-C of the pack chamber with the door opened.
Figure 5B:
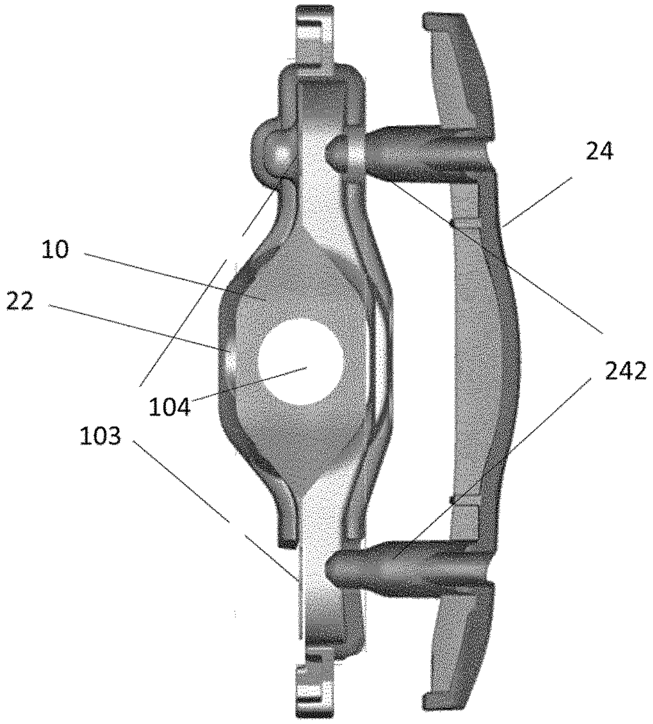

FIGS. 5A and 5B illustrates the pack holder assembly in the situation where the door 23 is opened.

The pack chamber 22 presents a plane shape oriented along a plane (Pc), said plane of the chamber being oriented in an essentially vertical position when the assembly is inside the module 1. As shown in FIGS. 4B and 4C, the pack chamber is adapted for holding the pack 10 so that the plane (P) of the pack extends along the plane (Pc) of the chamber.

When the door is opened, that is in the first opened position, the door 23 is inclined by an angle $\alpha$ of at least 45°, preferably at least 60° with said plane of the chamber (Pc). This inclination enables the use of the opened door as a handle while the pack chamber 22 is still oriented verticals inside the module.

The the pack holder assembly 2 comprises a movable locking device 24 that is configured to fix the pack 10, in particular the bottom of the pack, inside the pack holder assembly when the door 23 is in the second closed position, and to release the pack when the door is in the first opened position.

In FIG. 5A corresponding to this first opened position, it appears that this movable locking device 24 is mechanically connected to the door 23 so that it is configured to be tilt away from the chamber 22 when the door is in the first opened position.

The opening movement of the door 23 is a rotation along hinges 231 attached to the side walls of the chamber 22. The door is connected to each of said hinges by arms 234 presenting a shape configured to enable the position of the door in the first opened position either when the assembly 2 is hold in the receiving area 3 of the module, as illustrated in FIG. 4B, or when the assembly 2 is fully removed from the module, as illustrated in FIG. 4C. For this reason, the arm is configured to skirt round the upper edge of the fixed lower cover 6 of the receiving area.

The movable locking device 24 is attached to the lateral walls of the chamber through dedicated hinges 244 enabling the rotation of said device. In addition, the movable locking comprises a hole 2445 designed to cooperate with the hinges 231 of the door, so that:

- when the door 23 is opened, the bottom of the locking device is tilted away from the pack chamber,
- when the door 23 is closed, the bottom of the locking device is moved to the pack chamber.

In addition, this locking device 24 comprises two pins 242 configured to fit in corresponding holes 103 of the pack when the door 23 is in the second closed position.

In FIG. 5B corresponding to the cross-sectional view of the assembly 2 taken along plane AA of FIG. 5A, these two pins 242 are positioned away from the holes 103. In this position where the door 23 is opened, the operator is able to remove the pack form the pack holder or introduce a new one if the chamber is empty.

Figure 6A:
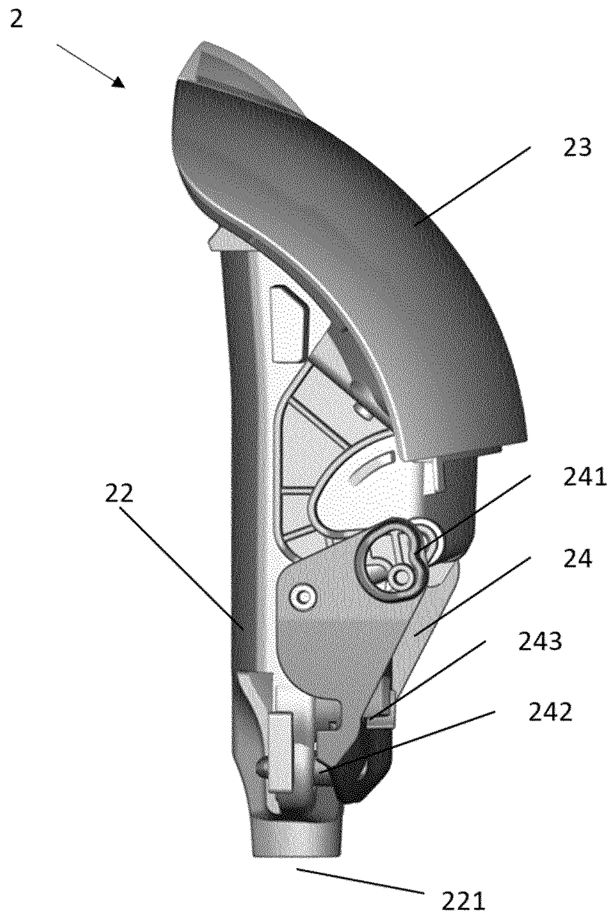
FIGS. 6A, 6B and 6C are respectively side view, back view and horizontal cross sectional view along A-A of the pack chamber with the door closed.
Figure 6B:
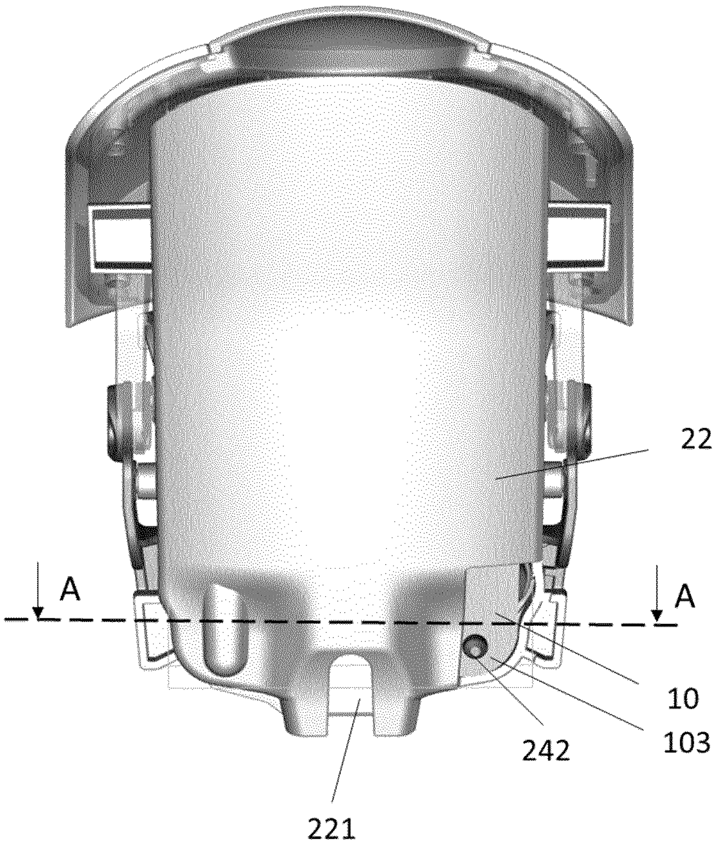
Figure 6C:
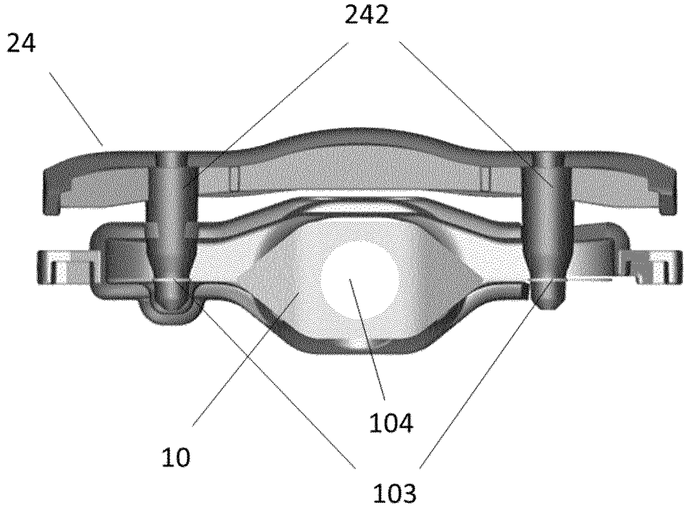

FIGS. 6A to 6C illustrates the pack holder assembly 2 in the situation where the door 23 is in the second closed position. Then, the bottom of the locking device 24 is positioned close to the chamber 22 and the pins 242 enters in the holes 103 of the pack present in the chamber. These corresponding pins and holes enable a correct position of the pack inside the chamber which guarantees a correct interaction with the fluid processing device 11. They also maintain firmly the pack during the introduction of the fluid processing device 11 and they prevent the upwardly movement of the pack inside the chamber when a fluid squirts inside the pack.

Figure 6D:
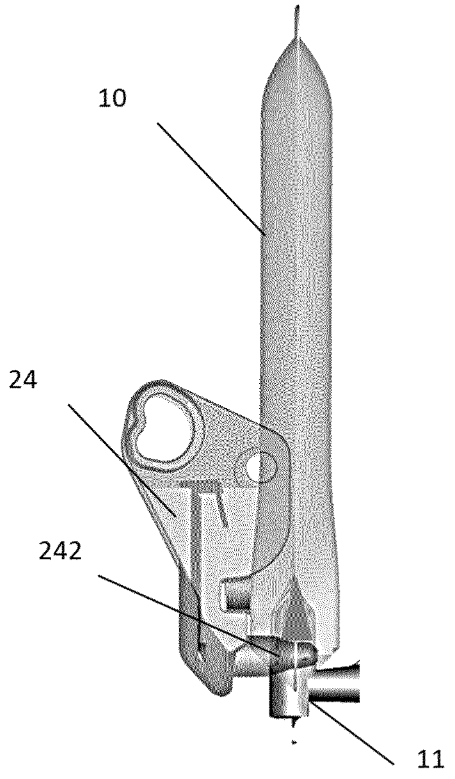
FIG. 6D is an isolated view of the pack hold by the locker and pierced the fluid processing device.

FIG. 6D illustrates the position of the pack 10, the pins 242 and the fluid processing device 11 when the latter is introduced in the openable area.

Preferably, the pack 10 comprises a readable code 102 in its bottom end 108 (see FIG. 1) and the module 1 comprises a code reader 4 inside the receiving area 3. As illustrated in FIGS. 5A and 6A, the movable locking device 24 is designed or comprises a pushing device 243 so that, when the door 23 is in the second closed position, the movable locking device 24 positions the code closer to the reader. The positions of the code on the bottom end of the pack and of the pushing device 243 in the locking device are set relatively to the position of the code reader 4 inside the module.

Figure 9:
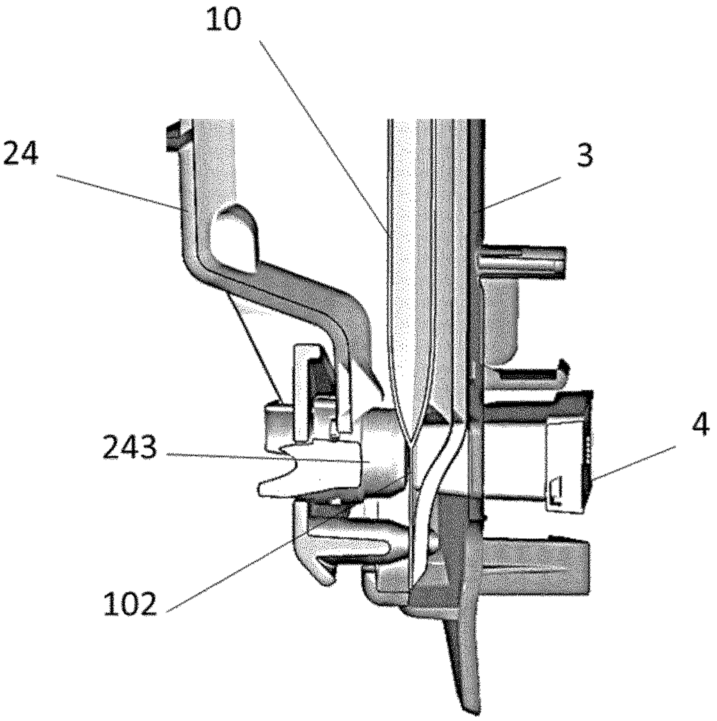
FIG. 9 is vertical section of the bottom part of the pack holder assembly introduced inside the receiving 3.

FIG. 9 is vertical section of the bottom part of the pack holder assembly introduced inside the receiving 3 of the module and with its door in its closed position. At the bottom of the receiving area, the module comprises a fixed code reader 4. The sachet 10 is hold inside the chamber so that its code 102 is in front of the code reader. In addition, as the door of the pack holder assembly is closed, its locking device 24 pushes the pushing device 243 in front of the code reader 4 so that the part of the pack holding the code 102 and positioned between the pushing device and the code reader is urged in direction of the reader. As a result, reading is improved.

Figure 7B:
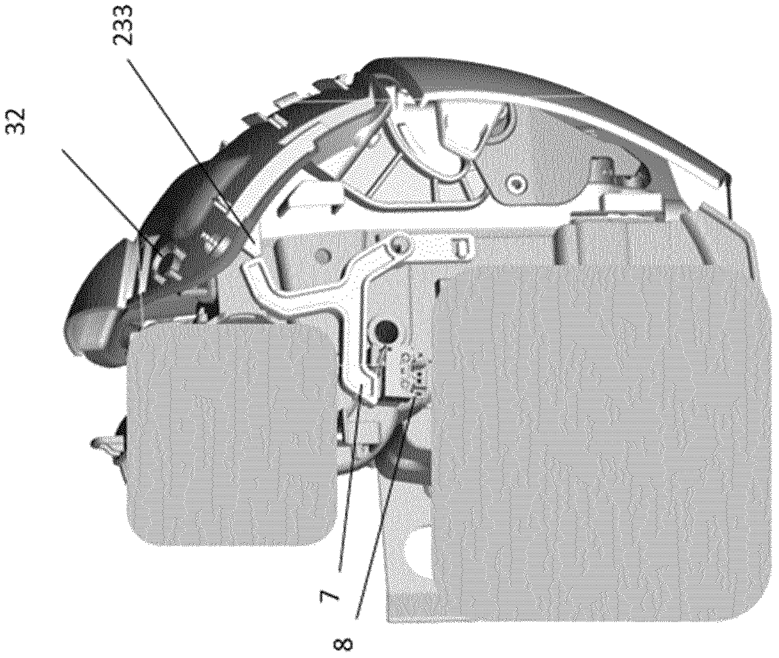
FIGS. 7A-7B are views of the module of the beverage production system illustrating the looking means of the door.
Figure 7A:
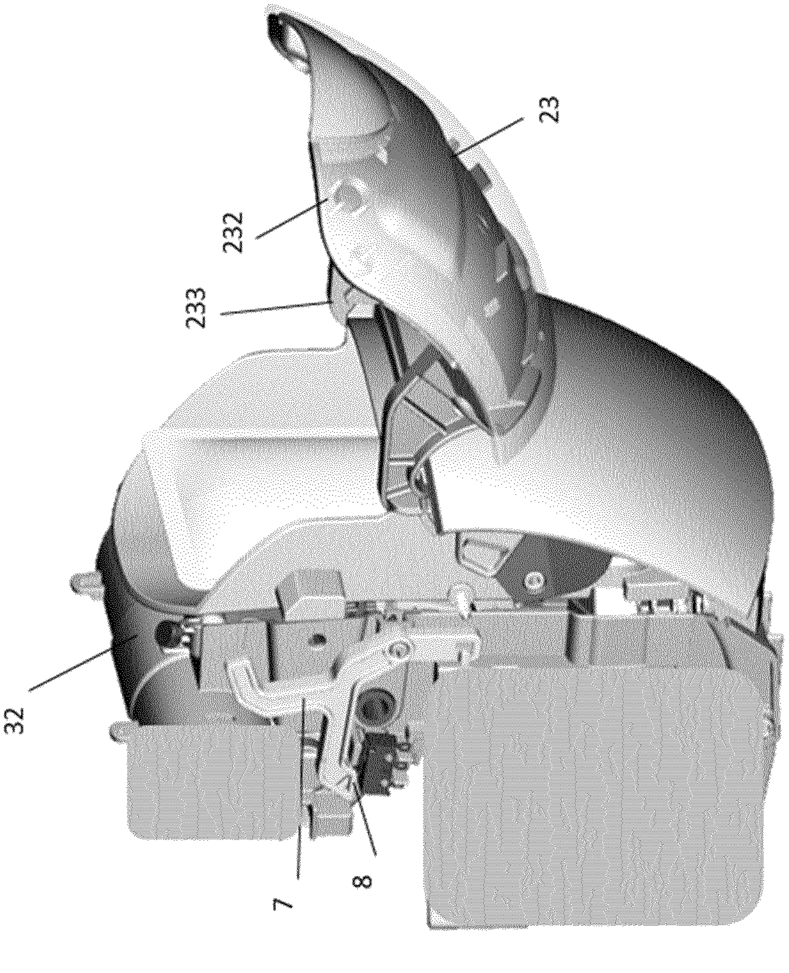

FIGS. 7A and 7B illustrates the preferred locking means of the door.

Generally, the module comprises an electrical switch 8 that can be switched on or off depending if the door 23 is closed or opened. In particular, a part 233 of the door can be designed to move a member 7 configured to switch on the electrical switch.

Preferably, the receiving area 3 comprises at least one first magnet 32 and the door 23 comprises at least one corresponding second magnet 232 positioned in the receiving area and in the door respectively so that, when the door is closed, the first and second magnets cooperate. The position of these both magnets improves the closure of the door 23 during the beverage preparation when a pack inflates too much and is able to push and open the door.

The position of the magnets close to the part 233 of the door designed to switch on the electrical switch improves the effect and holds the door even more firmly. Magnets provided at a lower position of the door were less efficient in keeping the door closed when the pack inflated.

Figure 8:
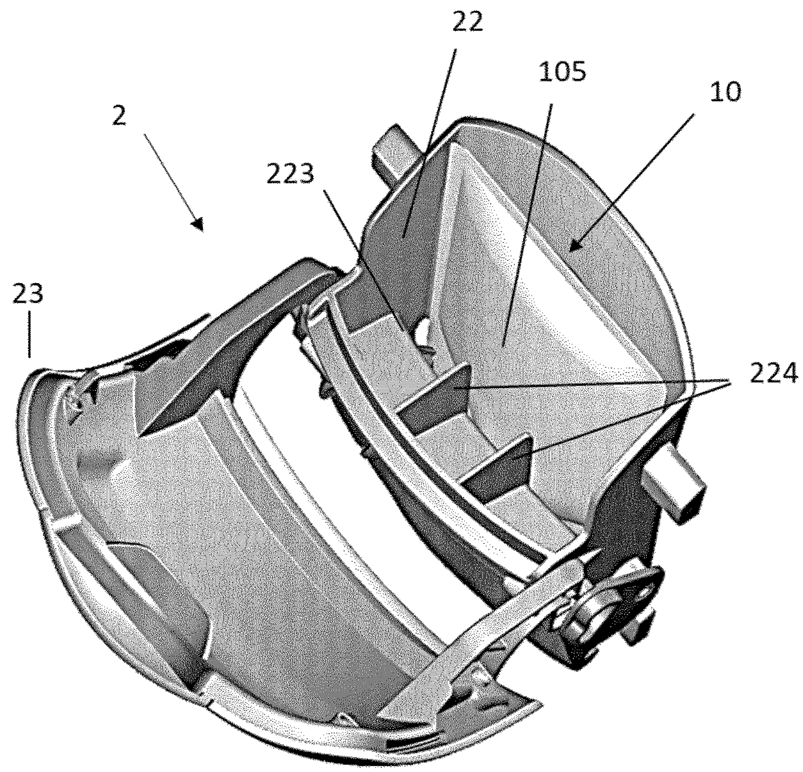
FIG. 8 is a perspective top view of the of the pack chamber with the door opened and a pack inside.

FIG. 8 is a top view of the opened pack holder assembly 2 with a pack 10 inside the chamber 22. In this preferred embodiment, below the door 23, the internal front wall 224 of the pack chamber comprises two ribs 224 that rise from this wall in direction of one of the longitudinal plane wall 105 of the pack. During the introduction of liquid at the bottom of the pack, these ribs 224 prevent an inflating of the wall 105 of the pack that could exert a force on the internal wall of the door and the opening of the latter. These ribs guarantee that the wall 105 of the pack remain away from the door 23 during the preparation.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS system 100
module 1
fluid processing device 11
inlet means 111
outlet means 112
pointed part 113
actuating device 12
fluid source 13
pumping means 14
heating and/or cooling means 15
system control unit 16
pack holder assembly 2
guiding means 21
pack chamber 22
bottom opening 221
pack inlet 222
internal front wall 223
internal back wall 224
rib 225
door 23
hinge 231
magnet 232
contacting part 233
arm 234
locking device 24
connection 241
pins 242
pushing device 243
hinge 244
receiving area 3
guiding means 31
magnet 32
code reader 4
frame 5
attached cover 6
movable member 7
electrical switch 8
pack 10
bottom side 101
code 102
hole 103
pierceable area 104
longitudinal plane wall 105
lateral sealed edge 106 top end 107 bottom end 108

The invention claimed is:

1. A beverage production system comprising a pack and a module for producing a beverage from said pack, said pack comprising:

an ingredient, said ingredient being configured to be mixed with a fluid to produce a beverage, said pack presenting a plane shape oriented along a plane, and a bottom side of said pack being configured for being openable, said module comprising:

a movable fluid processing device configured to cooperate with the bottom side of the pack to introduce the fluid into said pack and to dispense the beverage from the pack, and a pack holder assembly, said pack holder assembly comprising:

a pack chamber and a door, wherein:

the pack chamber is adapted for receiving said pack through an upper pack inlet and for holding said pack so that the plane of the plane shape is oriented in an essentially vertical position inside the module, and said pack chamber presenting a bottom opening configured to enable access of the movable fluid processing device to at least the bottom side of said pack in the pack chamber, and wherein the door is movable relatively to the pack chamber and is configured to be positioned in at least:

a first opened position wherein said door uncovers the upper pack inlet of the pack chamber, and a second closed position wherein said door covers the upper pack inlet of the pack chamber and is able to enclose the pack inside the pack chamber, and wherein, when the door is in the first opened position, the pack holder assembly is removable from the module.

2. The system according to claim 1, wherein, when the door is in the first opened position, the door forms a handle configured to pull manually the pack holder assembly out of the module.

3. The system according to claim 1, wherein:

the pack chamber presents a second plane shape oriented along a second plane, said second plane of the pack chamber being oriented in an essentially vertical position inside the module, and the pack chamber is adapted for holding the pack so that the plane of the pack extends along the second plane of the pack chamber, and in the first opened position, the door is inclined by an angle $\alpha$ of at least 45° with said plane of the chamber.

4. The system according to claim 1, wherein:

the module comprises a receiving area configured to receive and hold the pack holder assembly, and said receiving area and the pack holder assembly comprise respective cooperating configurations to position the bottom opening of the pack holder assembly relatively to the movable fluid processing device.

5. The system according to claim 1, wherein the pack holder assembly comprises a movable locking device, said movable locking device being configured:

to fix the pack inside the pack holder assembly when the door is in the second closed position, and to release the pack when the door is in the first opened position.

6. The system according to claim 5, wherein the movable locking device is mechanically connected to the door so that the movable locking device is configured to be tilted away from the chamber when the door is in the first opened position and to be pushed to the chamber when the door is in the second closed position.

7. The system according to claim 5, wherein the pack comprises at least two holes and the locking device comprises corresponding pins configured to fit in said holes of the pack when the door is in the second closed position.

8. The system according to claim 5, wherein:

the pack comprises a readable code, the module comprises a code reader, and the chamber and the movable locking device are designed so that, when the door is in the second closed position, the movable locking device positions the code in front of the code reader.

9. The system according to claim 1, wherein the fluid processing device comprises:

at least one fluid inlet for introducing the fluid into the pack in the pack chamber for preparation of the beverage by mixing said fluid with the ingredient contained in said pack, and at least one beverage outlet for dispensing said beverage from said pack in the pack chamber.

10. The system according to claim 1, wherein:

the module comprises:

a receiving area configured to receive and hold the pack holder assembly, and an electrical switch, when the pack holder assembly is in said receiving area, a contacting part of the door is designed to cooperate with the electrical switch so that:

in the first opened position of the door, said contacting part of the door directly or indirectly switches off the electrical switch, and in the second closed position of the door, said contacting part of the door directly or indirectly switches on the electrical switch.

11. The system according to claim 1, wherein:

the module comprises a receiving area configured to receive and hold the pack holder assembly and said receiving area comprises at least one first magnet, and the door comprises at least one corresponding second magnet, wherein said first magnet and said second magnet are positioned in the receiving area and in the door respectively such that, when the door is closed, the first and second magnets cooperate.

12. The system according to claim 11, wherein said first magnet and said second magnet are positioned at an upper part of the receiving area and at an upper part of the door respectively.

13. The system according to claim 1, wherein the pack chamber comprises an internal front wall, said internal front wall being positioned below the door, and wherein at least one rib rises from said internal front wall inside the pack chamber.

14. The system according to claim 1, wherein the door comprises at least one magnet, said at least one magnet being positioned at an upper side of the door.

15. The system according to claim 1, wherein the door comprises a contacting part designed to cooperate with an electrical switch of the module, said contacting part positioned at an upper part of the door.

16. The system according to claim 3, wherein in the first opened position, the door is inclined by the angle $\alpha$ of at least 60° with said plane of the chamber.

* * * * *